(No Model.)
M. R. HANLEY.
Manufacture of Dies.
No. 234,278. Patented Nov. 9, 1880.
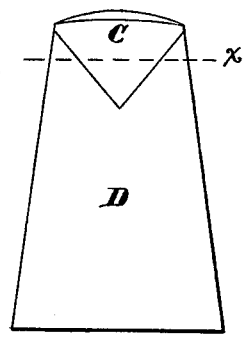
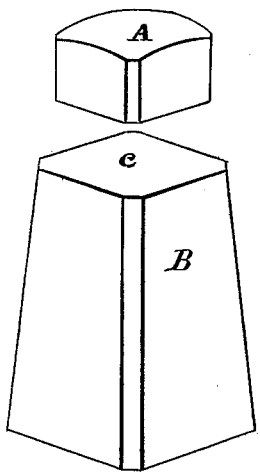
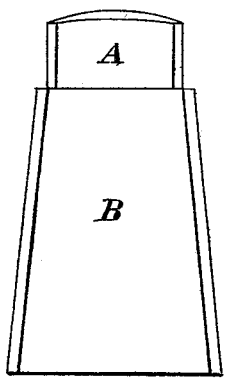
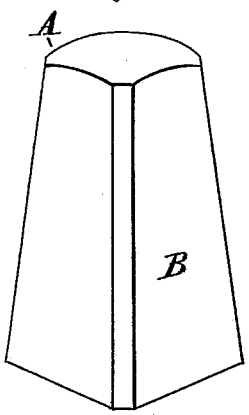
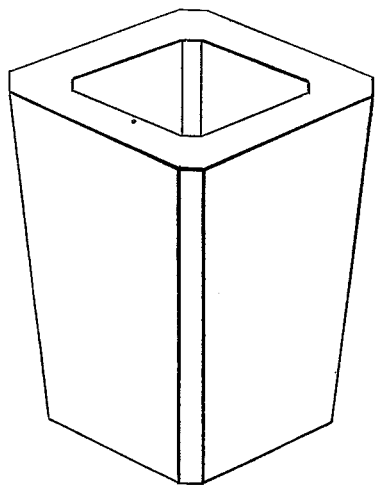
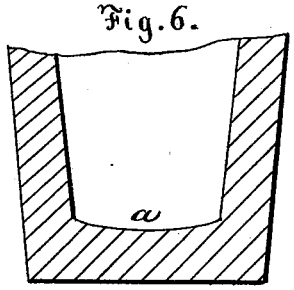
Witnesses:
Wm. A. McElwee
D. M. Keyser
Inventor:
Michael R. Hanley
By H. A. Daniels
Attorney.
N. PETERS, PHOTO-LITHOGRAPHER, WASHINGTON, D. C.

UNITED STATES PATENT OFFICE.

MICHAEL R. HANLEY, OF FALL RIVER, MASSACHUSETTS.

MANUFACTURE OF DIES.

SPECIFICATION forming part of Letters Patent No. 234,278, dated November 9, 1880.

Application filed August 6, 1880. (No model.)

*To all whom it may concern:*

Be it known that I, MICHAEL R. HANLEY, of Fall River, in the county of Bristol and State of Massachusetts, have invented certain new and useful Improvements in the Manufacture of Dies; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to the manufacture of dies used in the manufacture of jewelry and various articles of stamped metal; and it consists in a new method for the manufacture of such dies, and an improved die manufactured for use as hereinafter set forth and described.

In the drawings referred to, Figure 1 illustrates the ordinary manner of putting the parts forming a die together. Fig. 2 shows, in perspective, the two parts, separately, of which my improved die is formed. Fig. 3 shows, in side view, the two parts of the die placed together before being welded together. Fig. 4 shows, in perspective, the die after being taken from the mold. Fig. 5 is a perspective view of the mold into which the die is driven. Fig. 6 is a partial view of the mold in vertical central section.

As now commonly constructed, the steel face C, Fig. 1, of a die is made in the form of a wedge, and the iron base D is provided with a corresponding angular recess or notch to receive the wedge, the two parts being put together as shown in Fig. 1, then heated to a welding heat and hammered together. For the purpose of welding, iron must be brought to a high white heat, while steel heated to the same degree loses its valuable properties. Therefore, by this mode of welding the iron cannot be brought to its proper welding heat without injury to the steel, and the result is either a bad weld, or, if a good weld is obtained, the steel has been too highly heated, and is more or less injured. These dies as now made are used in a stamp or power-hammer, and a perfect weld not being obtained the steel wedge is soon driven into and splits the iron base, or is driven to one side, and the die is rendered useless. A mistake in the impression would necessitate a new die or refacing the die, and the present method of manufacture will not admit of this, for as the face is ground off the area of the steel face is becoming smaller. For instance, suppose the steel face shown in Fig. 1 to be ground off as far as the dotted line indicated by $x$, it will be seen that its area is much reduced. Further, if a new impression is wanted, or an impression of another pattern, the same difficulty is presented and a new die becomes necessary.

My invention is intended to furnish a new process for the manufacture of dies by which the said imperfections may be avoided, and an improved die different in construction from those generally in use.

By the improved process the steel part of the die and the iron part to form the base are, for the purpose of welding, heated to different degrees of heat, said parts being heated separately for such purpose. The iron base is brought to its highest welding heat; but it is not necessary to heat the steel part quite to the welding-point, as the heated iron will impart a degree of heat to the steel when the two parts are placed together, as shown in Fig. 3, for the purpose of uniting them. When thus properly heated and placed together they are struck or driven into a mold of the required form, and the force of the blow or pressure forces the softer iron around the steel, making a solid weld and neat forging-work.

In the drawings, A designates the steel part of which the face of the die is formed, the under surface of which is a horizontal plane.

B indicates the iron base, the upper surface, $c$, of which is also a horizontal plane, and is slightly larger in area than the lower surface of the part A.

By the construction of the parts in the manner shown they are kept in proper position during the operation of welding and forming, and splitting the base and driving the steel to one side are avoided.

In making the mold shown in Figs. 5 and 6, a block of wrought-iron or other suitable metal is obtained having a hole through it centrally. Into one end of this hole a piece of steel is inserted, and the iron and steel are both heated to a welding-point and welded. The lower portion of the steel runs flush with the bottom of the block, and thus the base of the mold is formed of steel. While the iron and steel are hot the mold may be shaped for any desirable form of die by taking a finished die and driving it into the hole in the metallic block. The upper convex surface of the die (see Fig. 4) comes in contact with the interior surface of the heated steel, making it concave, as shown at *a* in Fig. 6.

The mold thus made is quite durable, and may be used many times for shaping, welding, and finishing dies, the steel bottom being concave and serving to give the face of the die the required convexity. The mold will also sustain heavier blows on the die, and thus cause a better weld.

I claim as my invention—

The method described of making dies from the steel part A and the iron part B, the former being a little less in area than the latter, and both parts being driven into a mold together, substantially as set forth and described.

In testimony that I claim the foregoing I have hereunto set my hand this 30th day of June, 1880.

MICHAEL R. HANLEY.

Witnesses:
HENRY ALDEN CLARK,
JEFFERSON B. VALENTINE.